United States Patent
Bryan, III et al.

[11] Patent Number: 6,048,598
[45] Date of Patent: Apr. 11, 2000

[54] COMPOSITE REINFORCING MEMBER

[75] Inventors: Thomas J. Bryan, III, Coraopolis; Willy M. Balaba, Monroeville; David M. Bryan, Coraopolis; Michael N. Tackie, Murrysville, all of Pa.

[73] Assignee: Balaba Concrete Supply, Inc., Pittsburgh, Pa.

[21] Appl. No.: 08/992,365

[22] Filed: Dec. 17, 1997

[51] Int. Cl.⁷ .................................................. B32B 5/12
[52] U.S. Cl. ........................ 428/108; 428/222; 428/212; 428/34.5; 428/372; 427/175; 427/178
[58] Field of Search ........................ 428/212, 222, 428/34.5, 372, 108; 156/148; 525/162; 427/175, 178

[56] References Cited

U.S. PATENT DOCUMENTS

| | | | |
|---|---|---|---|
| 4,431,774 | 2/1984 | Felder-Schraner et al. | 525/162 |
| 4,620,401 | 11/1986 | L'Esperance et al. | 52/309.15 |
| 4,684,567 | 8/1987 | Okamoto et al. | 428/257 |
| 4,910,076 | 3/1990 | Ando et al. | 428/245 |
| 4,958,961 | 9/1990 | Herbst et al. | 405/260 |
| 5,047,104 | 9/1991 | Preis et al. | 156/86 |
| 5,077,113 | 12/1991 | Kakihara et al. | 428/108 |
| 5,182,064 | 1/1993 | Ishizuka et al. | 264/137 |
| 5,346,731 | 9/1994 | Nakanishi | 428/34.5 |
| 5,362,542 | 11/1994 | Ozawa et al. | 428/70 |
| 5,520,999 | 5/1996 | Van Skyhawk et al. | 428/251 |
| 5,580,642 | 12/1996 | Okamoto et al. | 428/212 |
| 5,593,536 | 1/1997 | Kaiser | 156/433 |
| 5,609,806 | 3/1997 | Walsh et al. | 156/180 |
| 5,626,700 | 5/1997 | Kaiser | 156/180 |

OTHER PUBLICATIONS

Perry's Chemical Engineers' Handbook, 6th Edition, p. 23–51, McGraw Hill Book Company, 1984.

*Primary Examiner*—William Krynski
*Assistant Examiner*—Hong J. Xu
*Attorney, Agent, or Firm*—Douglas G. Glantz

[57] ABSTRACT

A corrosion resistant, light weight composite twisted rope rebar is disclosed for reinforcing concrete material, including providing a plurality of continuous glass fibers oriented substantially in the longitudinal axis and coated with a thermoset polyester resin and catalyst. In one aspect, the twisted rope rebar includes two or more bundles in a helical pitch of about two inches to six inches to form the twisted rope rebar.

20 Claims, 1 Drawing Sheet

COMPOSITE REINFORCING MEMBER

BACKGROUND OF THE INVENTION

1. Technical Field

This invention relates to structural reinforcing members commonly called rebar. In one aspect, this invention relates to glass fiber structural reinforcement rebar.

2. Background

Civil and architectural concrete structures commonly are reinforced by embedding rigid structural insert members, such as rigid rods or bars, into the concrete. Reinforcing members are used in civil and architectural concrete structures such as beams and columns of a building, piers of a bridge, or platens of a roadway.

Rebar is a term used to name the structural reinforcement insert members provided by rigid rod or bar, such as steel rod or bar, to be inserted into a less rigid material, such as concrete.

Currently, most rebar for precast and cast-in-place concrete is made from steel.

INTRODUCTION TO THE INVENTION

Steel rebar suffers from problems of corrosion and inherently low specific strength.

Steel corrosion reduces the bonding force between the steel and the concrete. Then, volume expansion of the steel causes cracks in the concrete construction because of corrosion. The reduced bonding forces and the number of cracks degrade the durability of the concrete construction.

The inherently low specific strength of steel comes from the inherently high specific gravity and density of steel. The low specific strength causes the anchoring members to carry high loads, thus limiting the life span of the concrete construction, e.g., such as a bridge.

An attempt to circumvent the corrosion problems can involve coating the rebar with epoxide coatings. Such epoxide coating remedies are only temporary in nature, since epoxide formulations are prone to saline egress through them, thus exposing the rebar to enhanced corrosion. Moreover, the temporary nature of the protection is compounded by the fact that the epoxides are subject to physical degradation by water.

A possible solution can involve the use of pultruded glass fiber formulations.

The Kaiser U.S. Pat. Nos. 5,593,536 and 5,626,700 assigned to Marshall Industries Composites of Lima, Ohio disclose apparatus for forming reinforcing structural rebar including a combination of pultrusion and SMC (sheet molding compound). The modified pultrusion produces a rebar having a core of thermoset resin reinforcing material and an outer sheet molding compound. Although the pultrusion product provides a limited degree of effectiveness, the manufacturing involves multi-step processing to be physico-mechanically effective. Commercial utility is hampered by the multi-step processing, rendering the product uneconomical and not feasible for most uses. Additionally, pultrusion is limited to the production of straight linear and constant cross-section profiles.

A corrosion proof and light weight composite substitute for steel concrete reinforcing rebar is needed which provides both the physico-mechanical efficiencies and lower costs attributable to steel rebar manufacturing and which overcomes the problems associated with steel corrosion.

It is an object of the present invention to provide a novel composite substitute for steel concrete reinforcing rebar.

It is an object of the present invention to provide a novel composite substitute for steel concrete reinforcing rebar which overcomes the problems associated with steel corrosion.

It is an object of the present invention to provide a novel composite substitute for steel concrete reinforcing rebar which provides the physico-mechanical efficiencies and lower costs attributable to steel rebar manufacturing.

It is an object of the present invention to provide a novel composite substitute for steel concrete reinforcing rebar which overcomes the problems associated with the inherently low specific strength in steel.

It is an object of the present invention to provide a novel composite substitute for steel concrete reinforcing rebar which is corrosion proof and light weight.

These and other objects of the present invention will be described in the detailed description of the invention which follows. These and other objects of the present invention will become apparent to those skilled in the art from a careful review of the detailed description and by reference to the figures of the drawings.

SUMMARY OF THE INVENTION

The product and process of the present invention provide a corrosion resistant, light weight composite twisted rope rebar for reinforcing concrete material, including a plurality of continuous glass fibers oriented substantially in the longitudinal axis and coated with a thermoset polyester resin and catalyst. In one aspect, the twisted rope rebar includes two or more bundles in a helical pitch of about two inches to four inches to form the twisted rope rebar.

DETAILED DESCRIPTION

Figure 1:
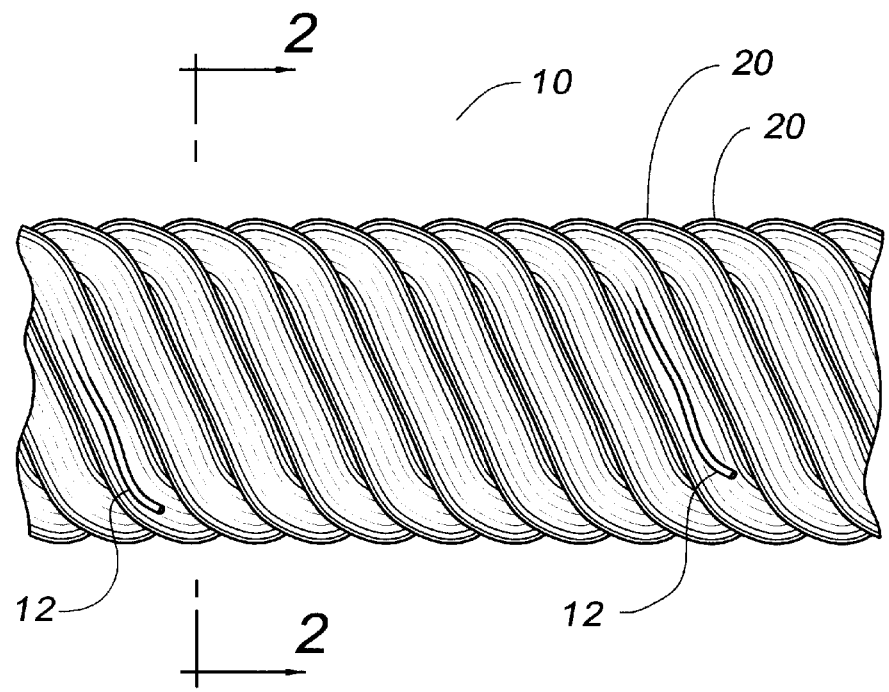
FIG. 1 is an elevational view of a twisted rope rebar made in accordance with the present invention.

Referring now to FIG. 1, structural twisted rope rebar 10 is shown having individual fibers 12. Rope rebar 10 is composed of a plurality of elongated continuous fibers 12 substantially oriented in their longitudinal axis. Fibers 12 are bound to each other by a thermosetting resin.

Structural twisted rope rebar 10 is shown having fibers 12 formed into helical bundles 20. The helical pitch and the diameter of the filament bundle are selected by the type of concrete used and the basic twisted rope rebar 10 diameter required. By pitch, it is meant the linear distance along rebar 10 for each bundle to make one cycle or complete revolution of the bundle around the rebar 10. The pitch should be in the range of about two (2) to six (6) inches. Generally, the pitch should vary between 1 and 10 times the diameter of the twisted rope rebar 10 to achieve an adequate concrete wetting during pouring. Pitch also can be viewed as a function of the diameter of the bundles 20 and fibers 12.

Figure 2:
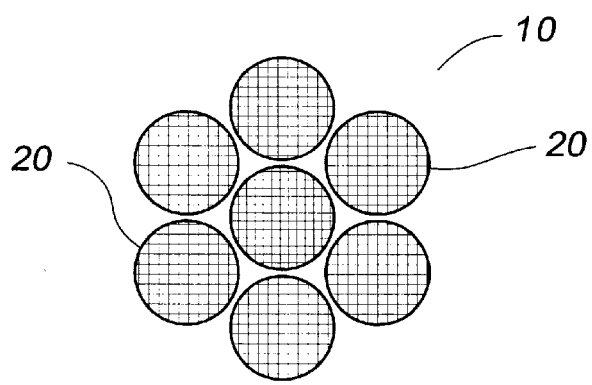
FIG. 2 is a cross-sectional view of the twisted rope rebar taken along lines 2—2 of FIG. 1.

Referring now to FIG. 2, the number of bundles 20 can vary from one to seven, with higher numbers selected to inhibit the twisting effect created by a longitudinal tensile load. The twisting effect could result in "unraveling" the twisted rope rebar 10.

Figure 3:
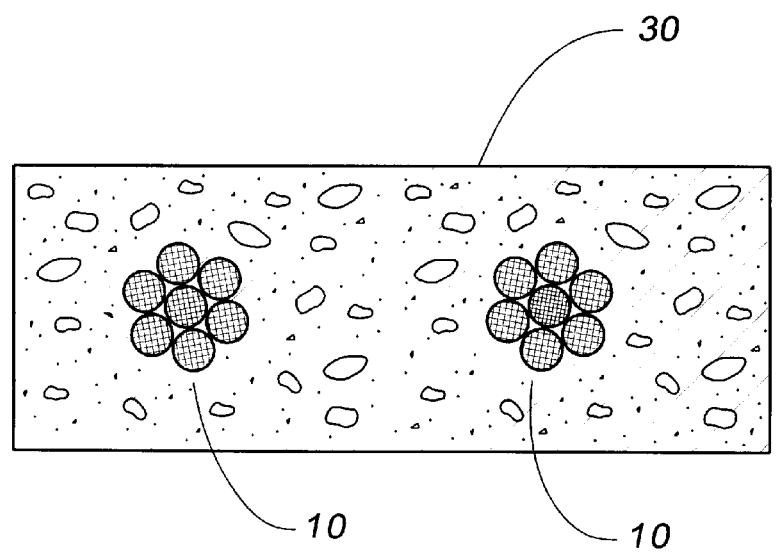
FIG. 3 is a cross-sectional view showing the twisted rope rebar embedded in a concrete material.

Referring now to FIG. 3, structural twisted rope rebar 10 is shown embedded in a mass of concrete material 30.

Continuous fibers 12 used in the construction of the twisted rope rebar 10 of the present invention are provided by fiber glass formed into filaments to provide a rigid, hard, and impervious substance which exhibits durability when exposed to corrosive materials. Preferably, the glass fiber composition is an E glass containing low amounts of alkali, high tensile strength, and high elasticity with low elongation.

Alternatively, other filaments can be used, e.g., such as filaments made of graphite, carbon, aramid (Kevlar,), filaments of polypropylene or polyester, and combinations of these filament materials. A combination of these filament materials is designed based on their different mechanical properties, combined with thermoset resin matrix, to produce an array of products having different hardness and flexibility in ratios (fiber/resin) that can vary, to make a twisted rope rebar with an elasticity modulus and tensile resistance which can vary by the combination of fibers selected while maintaining the diameter at a fixed value. The particular characteristics of organic fibers are advantageously combined with those of glass to form a hybrid material having high performance.

Glass fibers 12 are sized in the range of about $80 \times 10^{-5}$ to $100 \times 10^{-5}$ inches in diameter. Bundles 20 contain a number of glass fibers in the range of about 100 to 5000.

The twisted rope rebar of the present invention is formed by binding together filaments of fiber glass and channeling through a resin bath to impregnate the fiber glass filaments with resin in liquid form. The impregnated filaments then are cured. The thermoset resin solidifies and cures. The twisted rope rebar may be cut to predetermined lengths.

The product and process of the present invention provide a corrosion proof and light weight composite as a substitute for steel concrete reinforcing rebar.

The product and process of the present invention produce a glass fiber substitute rebar which concertedly, i.e., simultaneously polyester resin coats and twists glass fiber to produce and provide a novel twisted rope rebar. The polyester resin coats the glass fiber in single strands or tows of glass fiber in a bundle.

The product and process of the present invention produce a novel glass fiber substitute rebar which provides an outer peripheral surface having uneven profile for strengthening bonding with the concrete.

Curing the prepreg affords a more economical and physico-mechanically viable steel rebar substitute.

The product and process of the present invention incorporating the flexible prepreg provide for the manufacture of bent and non-linear profiles of the composite twisted rope rebar. Alternatively, glass fiber rope may be twisted initially, and subsequently impregnated with a catalyzed polyester resin, and subsequently cured.

EXAMPLE

An as received piece of twisted E glass, obtained from Owens Corning Fiberglass Corporation, Toledo, Ohio, was cleaned with isopropanol and dried at 105° C. overnight. The rope was immersed for one-half (0.5) hour in CoRezyn 30-DZ-200, a thermoset polyester available from Interplastic Corporation of Minneapolis, Minn. CoRezyn 30-DZ-200 is an isophthalic acid-propylene glycol polyester resin with a diluent of styrene, cured by various (0.1%–1%/, v/v) amounts of methyl ethyl ketone peroxide (MEKP) catalyst, obtained from Durr Marketing Associates, Inc., Pittsburgh, Pa. The rope was removed from the impregnation bath, cleaned to be free from excess resin, and then was formed into desired shapes. Curing at ambient temperature for 24 hours produced a formed rebar. Curing with heat at a temperature of 40° C. for one hour also produced a formed rebar. The formed rebar subsequently was cut to appropriate dimensions for physico-mechanical evaluation.

The results show that the process for forming a glass structural rebar is effective in providing a substitute for steel rebar as a reinforcing member.

Thus, it can be seen that the present invention accomplishes all of the stated objectives.

Although the invention has been illustrated by the preceding detailed description, it is not intended to be construed as being limited to the specific preferred embodiments employed therein.

Whereas particular embodiments of the invention have been described herein above, for purposes of illustration, it will be evident to those skilled in the art that numerous variations of the details may be made without departing from the invention as defined in the appended claims.

What is claimed is:

1. A process for forming a structural rebar for reinforcing concrete material, comprising:
   (a) providing a plurality of continuous glass fibers oriented substantially in the longitudinal axis;
   (b) coating said fibers with a polyester resin for binding said fibers;
   (c) twisting said coated fibers into two or more bundles helically twisted together in a helical pitch of about two inches to four inches to form a twisted rope; and
   (d) curing the polyester resin to form a corrosion resistant, light weight composite twisted rope rebar.

2. A process as set forth in claim 1 wherein said polyester resin comprises a thermoset polyester.

3. A process as set forth in claim 2 wherein said polyester resin comprises a thermoset polyester and catalyst.

4. A process as set forth in claim 2 wherein said thermoset polyester comprises isophthalic acid-propylene glycol polyester resin.

5. A process as set forth in claim 3 wherein said catalyst comprises methyl ethyl ketone peroxide catalyst.

6. A process as set forth in claim 5 wherein said curing comprises curing at a temperature of about 20° C. to 25° C. for about 24 hours.

7. A process as set forth in claim 5 wherein said curing comprises heating at a temperature of about 40° C. to 70° C. for about up to one hour.

8. A process as set forth in claim 1 wherein said glass fibers are composed of alkali resistant glass.

9. A process as set forth in claim 1 wherein said glass fibers are composed of E glass.

10. A process as set forth in claim 1 wherein said glass fibers are sized in the range of about $80 \times 10^{-5}$ to $100 \times 10^{-5}$ inches in diameter.

11. A process as set forth in claim 10 wherein said bundles contain at least one other filament selected from the group consisting of graphite filament, carbon filament, aramid filament, polypropylene filament, and polyester filament.

12. A process as set forth in claim 9 wherein said bundles contain a number of glass fibers in the range of 100 to 5000.

13. A process as set forth in claim 9 wherein said glass fibers are composed of E glass sized in the range of about $80 \times 10^{-5}$ to $100 \times 10^{-5}$ inches in diameter.

14. A structural rebar for reinforcing a mass of concrete material comprising:
   (a) a plurality of continuous glass fibers oriented substantially in the longitudinal axis in two or more bundles helically twisted together in a helical pitch of about two inches to four inches;

(b) a thermoset polyester resin binding said fibers.

15. A structural rebar as set forth in claim 14 wherein said thermoset polyester comprises isophthalic acid-propylene glycol polyester resin with a diluent of styrene.

16. A structural rebar as set forth in claim 14 wherein said glass fibers are composed of E glass.

17. A structural rebar as set forth in claim 16 wherein said glass fibers are composed of E glass sized in the range of about $80 \times 10^{-5}$ to $100 \times 10^{-5}$ inches in diameter.

18. A structural rebar as set forth in claim 14 wherein said bundles contain at least one other filament selected from the group consisting of graphite filament, carbon filament, aramid filament, polypropylene filament, and polyester filament.

19. A structural rebar as set forth in claim 14 wherein said fibers are sized in the range of about $80 \times 10^{-5}$ to $100 \times 10^{-5}$ inches in diameter.

20. A process for forming a structural rebar for reinforcing concrete material, comprising:

(a) providing a plurality of continuous glass fibers sized in the range of about $80 \times 10^{-5}$ to $100 \times 10^{-5}$ inches in diameter and oriented substantially in the longitudinal axis;

(b) coating said fibers with a thermoset polyester resin and catalyst of methyl ethyl ketone peroxide catalyst for binding said fibers;

(c) twisting said coated fibers into a bundle;

(d) twisting two or more bundles in a helical pitch of about two inches to six inches to form a twisted rope; and (e) curing the thermoset polyester resin to form a corrosion resistant, light weight composite twisted rope rebar.

* * * * *